Figure 1:
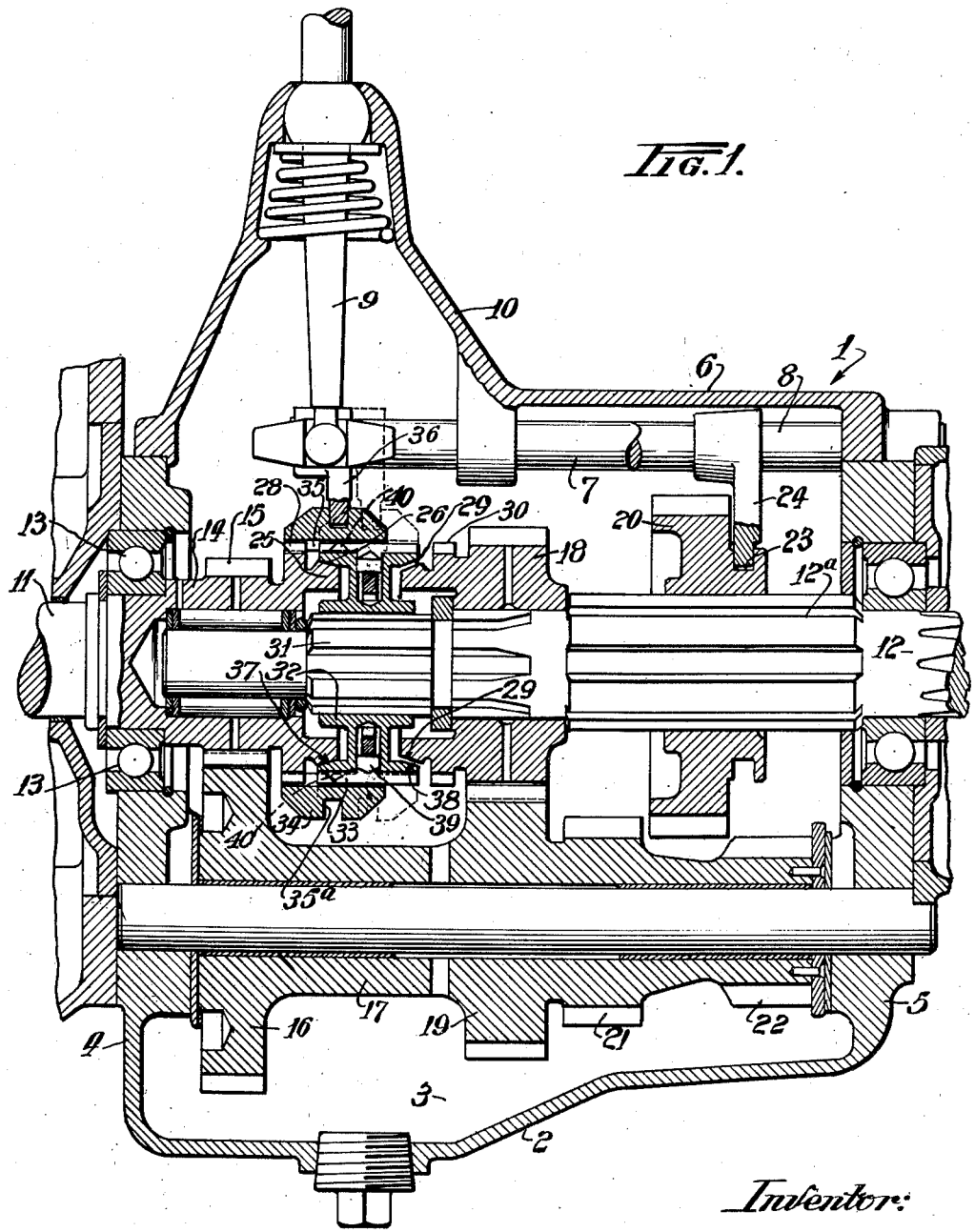

June 9, 1936.   C. H. BARTON   2,043,692
SYNCHRONIZING MECHANISM
Filed March 11, 1931   2 Sheets-Sheet 2
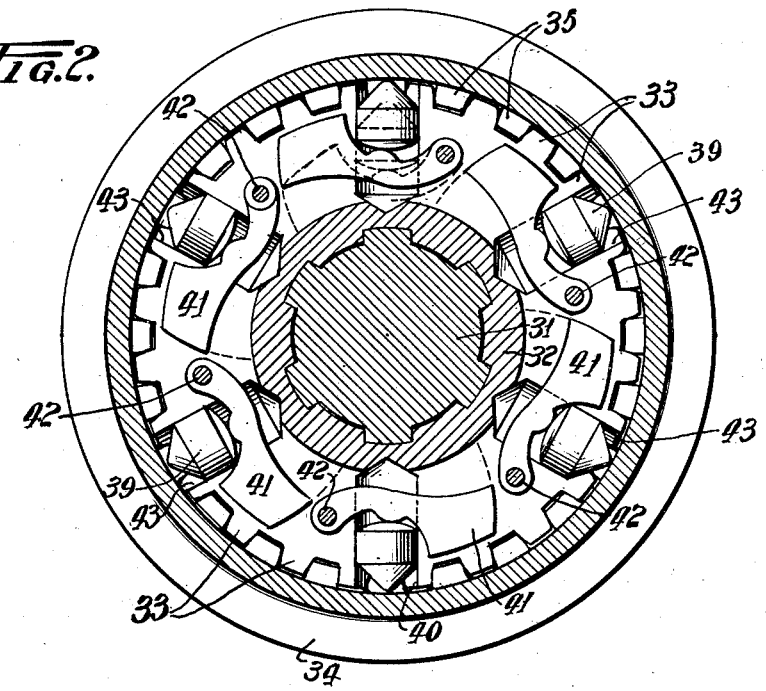
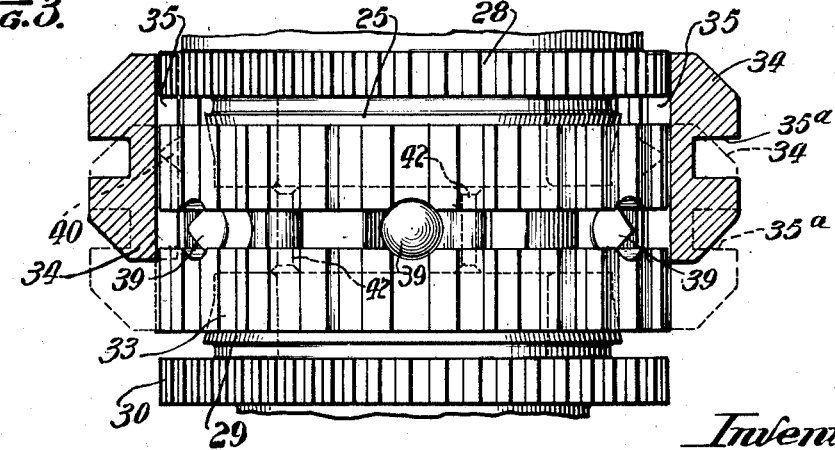

Patented June 9, 1936

2,043,692

UNITED STATES PATENT OFFICE 2,043,692

SYNCHRONIZING MECHANISM

Clarence H. Barton, Indianapolis, Ind., assignor, by mesne assignments, to William C. Starkey, Raymond S. Pruitt, and Walter H. Beal, trustees Application March 11, 1931, Serial No. 521,618

7 Claims. (Cl. 192—53)

This invention relates to improvements in synchronizing mechanisms and it consists of the matters hereinafter described and more particularly pointed out in the appended claims.

My invention is especially adapted for use in transmissions of automotive vehicles and it will be so described, but as will be apparent, certain of the features thereof may also be used for other purposes where the peculiar characteristics of the invention make it of advantage to do so.

My invention relates more particularly to mechanisms employed in transmissions for synchronizing the speed of the parts to be operatively connected together preparatory to the speed changing or shifting operation and which are often termed synchronizing-mesh transmissions.

In such synchronizing-mesh transmissions the work done by the synchronizer in bringing the parts to substantially the same speed, varies with the different speeds of the transmission and the inertia of the parts to be overcome, varies as the square of the speeds. Therefore, the effort required to synchronize the gears varies as the square of the speed but, so far as I am aware, all synchronizers have been built with mechanism which exerts the same pressure at all times, regardless of the speed of the parts. Several of them are built with a poppet and spring and in this type, there is great difficulty in obtaining a spring pressure which will work satisfactory at the various speeds. I have observed that such transmissions are designed with a spring pressure in the synchronizer which is suitable for obtaining proper gear shifting at high speed, but that when the attempt is made to shift gears at low or idling speed the spring pressure is entirely unsuited for synchronizing the parts. That is to say, at lower speeds the spring pressure is so great that due to the reduced inertia forces obtaining at low speed they are frequently instantly locked together and oftentimes in a position unsuitable for completing the gear shift. As a result, it has been found necessary to try to find a medium condition of spring pressure which is not entirely unsuited for either high or low speeds but is properly operable only at an intermediate speed, thus sacrificing perfect operation at low and high speeds.

The general object of my invention is to provide a synchronizing mechanism for use in a transmission which shall operate equally efficiently and properly at the various speeds, i. e. low, intermediate and high.

A further and more specific object of the invention is to provide means, in a transmission, which will operate to synchronize the parts in variable amounts such variation preferably to be in proportion to the square of the speeds, thus furnishing a resistance which is in direct proportion to the variation in the work to be accomplished.

The above named objects of the invention, as well as others, together with the many advantages thereof, and the means by which they are accomplished, will more fully appear as I proceed with my specification.

In the drawings: —

Fig. 1 is a longitudinal vertical sectional view through a transmission wherein is employed a synchronizing mechanism embodying my invention.

Fig. 2 is an enlarged vertical section taken through the synchronizer ring and shift collar and showing the shift collar centrally positioned with respect to the synchronizer ring and the detent plugs of the synchronizing means in their outermost position in the notches in the internal gear teeth of the collar; and Fig. 3 is a view showing the synchronizer ring in plan elevation and the shift collar in section and in one of its shifted positions with respect to the ring.

Referring now in detail to that embodiment of my invention, illustrated in the accompanying drawings:—1 indicates the casing of a change speed transmission which has an open top and includes a bottom wall 2, side walls 3 and end walls 4 and 5. Associated with said casing and closing the open top thereof is a cover 6 which is secured to the casing in any suitable manner. In said cover are the shift rods or rails 7 and 8, both formed at their front ends to be operatively engaged by the bottom end of a shift lever 9 having a ball and socket engagement in a hollow cone-like housing 10 rising from one end of the cover 6.

The shift rod 7 is for the second and high gear of the transmission while the rod 8 is for the low and reverse gear.

11 indicates the drive shaft of the transmission. It is adapted to be connected to the engine (not shown) in any suitable manner and 12 indicates the coaxially disposed driven shaft of the transmission adapted to be connected to the propeller shaft of an automobile in any suitable manner.

The drive shaft 11 which is journalled in an anti-friction bearing 13 in the front wall 4 of the casing is enlarged as at 14 and has a gear 15 formed thereon which is constantly in mesh with a gear 16. The latter forms a part of a gear cluster 17 which is suitably mounted for rotation on a horizontal shaft in the bottom portion of the casing 2 of the transmission. Rotatably mounted on the driven shaft 12 is a gear 18 which is constantly in mesh with a gear 19. The latter like the gear 16 forms a part of the gear cluster 17. The gear 15 is the driving gear for the gear cluster 17 and gear 18 is the second speed gear.

Longitudinally shiftable on the splined part 12ª of the driven shaft 12 is a gear 20 which is adapted to be shifted into engagement with a low speed gear 21 of the gear cluster 17 and into mesh with the usual idler reverse gear (not shown) which meshes with the gear 22 of the gear cluster. The gear 20 is provided on its hub with an annular groove 23 in which is engaged the shifter yoke 24 secured to the shift rod 8 so as to be actuated thereby.

The drive shaft 11 terminates in an enlarged annular portion 25 on the outer surface of which is formed a cone clutch surface 26 and between the gear 15 and the cone clutch surface 26 is formed an annular row of clutch teeth 28.

Integral with the gear 18 is a cone clutch surface 29 of the same diameter as the cone clutch surface 26, these cone clutch surfaces being arranged with their small, truncated ends facing each other. Between the clutch surface 29 and gear 18 is arranged an annular row of clutch teeth 30 similar to the clutch teeth 28 associated with the gear 15.

The driven shaft 12 is provided with a splined portion 31 and shiftably mounted thereon is a ring 32, hereinafter termed the synchronizer ring. On the external periphery of the synchronizer ring 32 are teeth 33. Surrounding the synchronizer ring is a shift collar 34, having internal teeth 35 which mesh with the external teeth 33 of the synchronizer ring 32. The shift collar 34 is also provided with a shifter groove 35ª for the reception of the shifter yoke 36 which is actuated by shifter rod 7 by means of the shift lever 9.

The synchronizer ring 32 is provided with internal conical surfaces 37 and 38 for engagement with the mating external cone clutch surfaces 26 and 29 respectively associated with the gears 15 and 18.

In the synchronizer ring 32 I have arranged a plurality of radially disposed detent plugs 39 for engagement with certain V-shaped notches 40 in the central portions of the internal teeth 35 of the shift collar 34. The notches are preferably formed by a milling operation and are formed in all of the teeth for convenience in the milling operation. The detent plugs 39 engage, however, only the notches 40 and the teeth 35 with which they are in alignment.

Normally, i. e. when the transmission is in neutral the shift collar is centered on the synchronizer ring as shown in dotted lines in Figs. 1 and 3 being held there by the detent plugs 39. When the transmission parts are rotating the shift collar 34 cannot be shifted axially on the synchronizer ring 32 until the detent plugs 39 are depressed out of their respective notches 40 which action is resisted by centrifugal pressure weights 41 pressing against the plugs 39. The weights 41 are fulcrumed at 42 in the synchronizer ring being accommodated in grooves 43 in said ring.

The operation of the device is as follows:—
Normally when the transmission is in neutral the synchronizer ring 32 is centrally disposed between the cone clutch surfaces 26 and 29 with its mating cone clutch surfaces 37 and 38 out of engagement with said cone clutch surfaces 26 and 29. Shifter collar 34 is at this time centrally disposed on synchronizer ring 32 as indicated by dotted lines in Figs. 1 and 3. Gears 15, 16, 18 and 19 being constantly in mesh, are of course, rotating. Assuming that it is desired to shift to high gear the shift collar is moved to the full line position (Fig. 1) by means of the shift lever 9, thus bringing its teeth 35 into mesh with the clutch teeth 28 integral with high gear 15 and as they are still engaged with the external teeth 33 of the synchronizer ring, which in turn is splined to driven shaft 12, as indicated at 31, the driven shaft is operated at high speed. Before shift collar 34 can shift axially of the synchronizer ring 32 it must first depress the detent plugs 39 which action is resisted by the centrifugal pressure weights 41. Hence, the first action is to move both shift collar and synchronizer ring axially toward the cone surface 26 whereupon the cone surface 37 engages said mating cone surface 26 and synchronizes the speed of the ring 32 and gear 15 whereupon the shift collar depresses the detent plugs 39 and moves axially of the synchronizer ring and thereby connects the parts as before described.

By this construction, the centrifugal force exerted by the weights 41 will vary as the square of the speed, thus furnishing a resistance to plugs 39 which will likewise vary as the square of the speed. I have thus provided a variable resistance which is what is needed for the proper functioning of the synchronizing action, in order that it may function equally well at all speeds. Hence this construction overcomes the objectionable features inherent in devices which apply the same pressure irrespective of the speed of the parts.

It will of course, be understood, that the same action obtains in shifting to intermediate gear, the parts simply being shifted in the opposite direction to form an operative connection with gear 18.

While in describing the invention, I have referred in detail to the form and arrangement of the various parts thereof, the same is to be considered merely as illustrative, so that I do not wish to be limited thereto except as required by limitations in the appended claims.

I claim as my invention:—

1. In combination, a gear, a driven shaft, a synchronizer ring rotatable with the driven shaft, a shift collar carried by the synchronizer ring and shiftable axially thereof, means for shifting the shift collar and synchronizer ring to first cause pressure contact between the synchronizer ring and gear, and means operable by centrifugal action during rotation of said ring for applying pressure to restrain axial movement of the shift collar on the synchronizer ring, comprising detent members carried by the ring and adapted to engage the collar and movable elements applied to the detent members and operable in response to centrifugal force to press the detent members into contact with the collar with increasing pressure as the speed of the ring increases.

2. In combination, a gear, a driven shaft, a synchronizer ring rotatable with the driven shaft, a shift collar carried by the synchronizer ring and shiftable axially thereof, means for shifting the shift collar and synchronizer ring to first cause pressure contact between the synchronizer ring and gear, and means operable by centrifugal action during rotation of said ring for applying pressure to restrain axial movement of the shift collar on the synchronizer ring comprising detent members carried by the ring and engageable with the collar and pivoted lever elements associated with the ring and operable in response to centrifugal force to press the detent members into contact with the collar with increasing pressure as the speed of the ring increases.

3. In combination, a gear, a shaft, a friction clutch part rotatable with the gear, a synchronizer ring rotatable with the shaft, a friction clutch part associated with the synchronizer ring, manually operable means for causing pressure engagement of the clutch parts for synchronizing said parts preliminarily to connecting the gear and shaft, and means operating under centrifugal action in the rotation of said ring for varying the effort required to actuate said manually operable means in accordance with the speed of the synchronizer ring, comprising a plurality of pivoted lever elements having weights at the distal ends thereof.

4. In combination, a gear, a shaft, a synchronizer ring rotatable with and shiftable axially on the shaft, a shift collar rotatable with and axially shiftable on the synchronizer ring, mating clutch portions associated with the gear and synchronizer ring, clutch teeth associated with the gear, means for shifting the synchronizer ring and shift collar axially to first cause pressure engagement of the mating clutch parts, and then to move the shifter collar axially of the synchronizer ring to mesh with the clutch teeth associated with the gear, and means for retarding axial shift of the collar on the synchronizer ring comprising a plurality of radially movable detents carried by the ring and adapted to engage the collar and a corresponding number of pivoted lever-like elements which are applied to the detent members and have weights at the distal ends thereof whereby they operate in response to centrifugal force to press the detent members outwardly against the collar with increasing pressure as the speed of the ring increases.

5. In combination, a gear, a shaft, a synchronizer ring rotatable with and axially shiftable on the shaft, mating friction clutch parts associated with the gear and synchronizer ring, clutch teeth associated with the gear, a shift collar rotatable with and shiftable axially on the synchronizer ring and having teeth adapted to mesh with the clutch teeth associated with the gear, means for moving the synchronizer ring and shift collar axially of the shaft to first cause pressure engagement of the clutch parts and then to shift the shift collar axially of the synchronizer ring to mesh the teeth of the shift collar with the teeth associated with the gear, detent plug means carried by the ring so that they engage the shift collar and serving to retard axial shift of the collar relatively to the ring, and pivotal elements carried by the ring and operable in response to centrifugal force to urge the plug means into engagement with the collar with increasing pressure as the speed of the synchronizer ring increases.

6. In combination, a driving member, a driven shaft, a synchronizer ring rotatable with the driven shaft, a collar rotative with the shaft but capable of movement axially thereon, means for imparting axial movement to said ring and collar to first cause pressure contact of the ring with the driving member and means carried by said ring and including levers pivoted to said ring upon axes parallel with the driven shaft for applying pressure to restrain axial movement of the collar on the ring, said levers operating centrifugally so that the pressure applied varies with the speed of the ring.

7. In combination, a gear, a driven shaft, a synchronizer ring rotatable with the driven shaft, a shift collar carried by the synchronizer ring and shiftable axially thereof, means for shifting the collar and synchronizer ring to first cause pressure contact between the synchronizer ring and gear, and means for retarding axial movement of the shift collar on the synchronizer ring by way of the application of pressure to the collar in increasing amount as the speed of the ring increases, said means including pivoted lever-like elements carried by the collar.

CLARENCE H. BARTON.